ations Patent [19]

United States Patent [19]

Cyr

[11] 4,401,987
[45] Aug. 30, 1983

[54] RANGING SYSTEM HAVING REDUCED RECOGNITION JITTER

[75] Inventor: Reginald J. Cyr, Goleta, Calif.

[73] Assignee: Sonatech, Inc., Goleta, Calif.

[21] Appl. No.: 26,560

[22] Filed: Apr. 3, 1979

[51] Int. Cl.³ .................. G01S 13/76; G01S 15/74
[52] U.S. Cl. .................. 343/5 CF; 343/17.1 R; 343/17.7; 367/97
[58] Field of Search ............ 343/5 CF, 17.7, 17.1 R; 367/97

[56] References Cited

U.S. PATENT DOCUMENTS 3,755,814  8/1973  Alpers ..................... 343/17.1 R Primary Examiner—T. H. Tubbesing
Attorney, Agent, or Firm—Finkelstein & Tyson

[57] ABSTRACT

A ranging system employing a limiting constant false alarm rate (CFAR) receiver having reduced recognition time uncertainty, or recognition jitter. The jitter is made proportional to signal-to-noise ratio by providing the receiver with a two-part signal. A conditioning signal is provided to the receiver prior to the time the receiver is expected to sense and respond to a recognition signal for ranging. The conditioning signal has selected strength and duration sufficient to suppress noise to a desired extent in the receiver at the time the recognition signal is received. The combination of strength and frequency of the conditioning signal is selected so as to limit the probability of a false alarm, or undesired recognition of the conditioning signal in the receiver. Receiver modification is not required.

34 Claims, 4 Drawing Figures

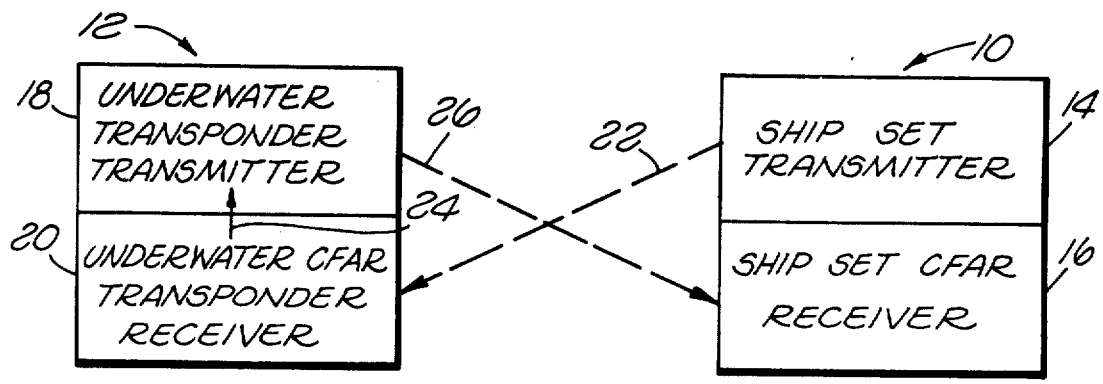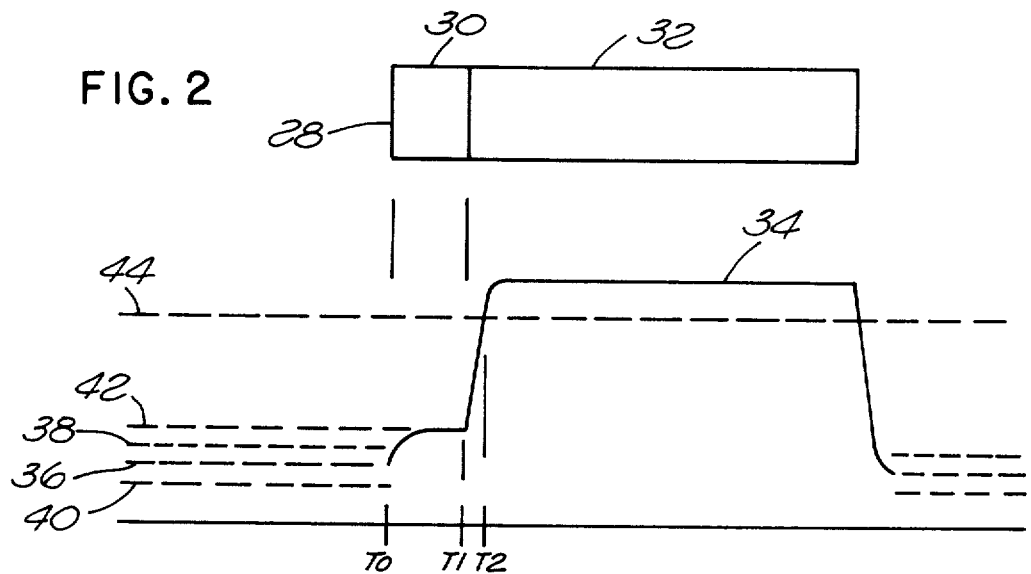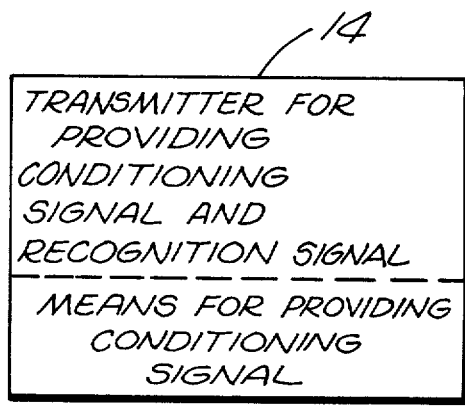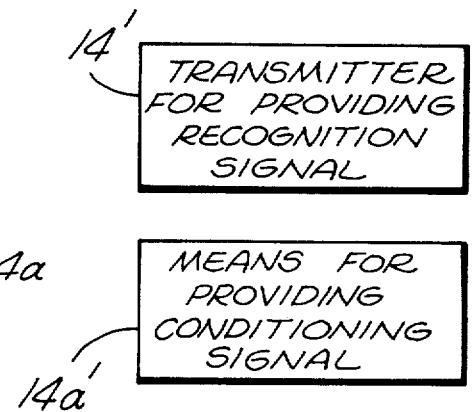

RANGING SYSTEM HAVING REDUCED RECOGNITION JITTER

BACKGROUND OF THE INVENTION

The present invention relates to ranging systems, including radars and acoustic navigation systems, which employ limiting constant false alarm rate receivers, and, in particular, to an improvement in such systems which reduces recognition jitter.

Acoustic ranging is used in ship navigation and in similar applications such as, for example, torpedo tracking.

A torpedo tracking system typically uses a one-way link. At known times, a transmitter in a torpedo initiates pulsed recognition signals at a fixed carrier-wave frequency. Each pulsed recognition signal is a tone-burst. The tone-bursts propagate through water to a plurality of acoustic pick-up transducers, or hydrophones, at known locations. The location of the torpedo is determined in a receiver by comparing the times of arrival of the tone-bursts at the several hydrophones.

A typical acoustic navigation system for ships uses a two-way link. On the ship, a ship set includes a transmitter, a receiver and an acoustic transducer mounted below the water line on the ship's hull. Transponders are at known locations on the ocean floor, each similarly including an acoustic transducer, a receiver and a transmitter. An interrogation signal pulse, or tone-burst, is initiated by the ship-set transmitter. When the interrogation tone-burst is recognized in the transponder receiver, the transponder transmitter initiates propagation of a reply tone-burst, which is subsequently recognized in the ship-set receiver. In order to avoid confusion between remotely transmitted signals and echo returns from a locally transmitted signal, the carrier-wave frequencies of the interrogation and reply signals are preferably selected to be different from each other. In addition, the carrier-wave frequencies of the transmitters of a plurality of transponders in the vicinity of each other may all be selected to be different from each other as a code to identify the source of a reply recognition signal.

Constant false alarm rate (CFAR) receivers have found broad application in acoustic ranging systems. They are also useful in radars. The characteristics of such receivers are discussed generally in Skolnick, Radar Handbook, New York, McGraw-Hill Book Co., 1970, Sec. 5.8, page 5-29 et seq. An implementation for limiting CFAR receivers is disclosed in U.S. Pat. No. 3,320,576, "Receiver For Processing A Plurality of Adjacent Closely Spaced Input Signals," issued May 16, 1977 to A. M. Dixon and Reginald J. Cyr. The latter co-inventor is the inventor herein. The entire disclosure of said patent is hereby incorporated by reference into this specification for its description of a CFAR receiver. Where the term CFAR receiver or constant false alarm rate receiver is used hereafter, a receiver of the type disclosed in said prior patent is intended to be indicated.

A CFAR receiver of the type disclosed in said prior patent uses a design in which the following functional elements typically operate in cascade: a broad-band input bandpass filter, a full limiter, one or more narrow-band bandpass filters, each of which operates to filter the limiter output, a detector for the output of each narrow-band bandpass filter, a smoothing filter for the output of each detector, and a threshold-responsive pulse-generating circuit for responding to the output of each smoothing filter.

The broad-band input bandpass filter minimizes the reception of noise at frequencies which are outside the range of all signal frequencies which it is desired to receive. The full limiter is a very high gain clipping amplifier which has a substantially constant amplitude output and therefore a substantially constant power output. Except for transitions between saturation limits, the limiter output is always saturated, even with no input to the receiver other than receiver self-noise or background noise from the environment. The frequency characteristics of the narrow-band bandpass filters are included within the passband of the broad-band filter. Each narrow-band filter characteristic is centered on the nominal carrier-wave frequency of a recognition signal which is desired to be received. This narrow-band frequency characteristic is made as narrow as is practical to reduce the probability of recognizing noise bursts as if they were signals when the noise power density is high at frequencies near the recognition signal carrier-wave frequency. In the marine environment, such noise bursts can emanate from, for example, ship engines, pumps and propellers. The selection of the bandwidth for a narrow-band bandpass filter is based on such considerations as, for example, pulse width of the recognition signal tone-burst, doppler frequency shift and drift of filter parameters due to such factors as, for example, variation in temperature and aging.

The bandwidth of the frequency characteristic for the broad-band input bandpass filter is typically selected to be about ten times the bandwidth of the narrow-band bandpass filter. This selection determines the bandwidth ratio for the CFAR receiver. The bandwidth ratio selected determines the extent to which noise which is passed by the broad-band input filter is suppressed at the output of the narrow-band filter in the absence of signal. Where the ratio of the bandwidth of the broad-band filter to the bandwidth of the narrow-band filter is ten-to-one, for example, the average noise power at the output of the narrow-band filter, in the absence of signal, is approximately one-tenth the average noise power at the output of the broad-band input filter.

In acoustic ranging systems, narrow-band bandpass filters typically have a bandwidth in the range from about 200 to about 600 hertz, while broad-band bandpass filters typically have a bandwidth in the range from about two to about six kilohertz.

Each smoothing filter integrates a detector output to provide a signal which is a measure of the energy in the passband of the associated narrow-band filter during a time interval of a predetermined length. The length of the smoothing time interval is determined by the smoothing filter parameters. When the smoothing filter output exceeds a preselected threshold value for recognition of signals, the associated threshold-responsive pulse-generating circuit generates a recognition pulse. The recognition pulse may be used, for example, to initiate reply signal transmission by a transponder transmitter, or, as another example, to determine elapsed time since the transmission of the interrogation signal in a range computer of a ship-set receiver in an acoustic ranging system.

When no signal is present at the input to a CFAR receiver, the limiter is controlled by a combination of self-noise and environmental noise. The limiter output waveform resembles a square wave. The amplitude of the waveform is fixed by the limiter clipping or saturation levels. However, the period of the waveform varies due to the noise. Under these same conditions, the narrow-band filter output waveform resembles a sine wave, but both the period and amplitude of the sine wave vary with time as nonlinear functions of the instantaneous noise characteristics. The smoothing filter output level fluctuates in response to the amplitude variations of the narrow-band filter output.

When a substantially constant-amplitude, monochromatic, pulsed signal, such as, for example, a tone-burst, is present at the input of a CFAR receiver, the noise-induced variations and fluctuations in the receiver are suppressed. The period of the waveform at the output of the limiter approaches the substantially constant, or monochromatic, period of the signal carrier wave. Similarly, at the output of that narrow-band filter the passband of which includes the signal carrier-wave frequency, the waveform approaches that of a sine wave of constant amplitude and period. The fluctuations in all smoothing filter output levels are reduced accordingly. The extent to which noise-induced variations and fluctuations are suppressed by the presence of signal in a CFAR receiver, is proportional to the signal-to-noise ratio.

Stated alternatively, as the signal present in the output of the limiter increases and acquires control over a portion of the substantially constant limiter output power, less of that power remains available for noise. Thus, the presence of signal suppresses the noise in a CFAR receiver including noise at the output of a smoothing filter, and, correspondingly, at the input to the associated threshold-responsive pulse-generating circuit.

For a sufficiently large signal-to-noise ratio, and given that the frequency of the signal is in the passband of a narrow-band filter, the associated smoothing filter output level rises above its average noise-only (absence of signal) level by a factor which is approximately equal to the bandwidth ratio. Increases in the signal-to-noise ratio beyond this point, however, produce no additional significant increase in the smoothing filter output level and corresponding threshold-responsive pulse-generating circuit input level. This is due to the limiting action of the limiter.

As has been indicated, recognition of an interrogation recognition signal pulse or a reply recognition signal pulse occurs in a CFAR receiver when the smoothing filter output and corresponding threshold-responsive pulse-generating circuit input exceeds a preselected recognition threshold value. The recognition threshold value selected determines the probability of signal recognition and the accompanying false alarm rate for a given signal-to-noise ratio. Once a tone-burst arrives at the input of the CFAR receiver, the mean time required for the smoothing filter output to rise to the recognition threshold value and trigger generation of a recognition pulse is a known or determinable function of system parameters and also a function of the average level of the smoothing filter output due to noise alone just prior to the time of arrival of the recognition signal tone-burst. These factors may be accounted for, and, if desired, corrected for in the calculation of range. However, another factor is not readily accounted for. The time-varying fluctuation in the level of the smoothing filter output about the average due to noise alone at the time a recognition signal tone-burst is available to increase the smoothing filter output level is a random variable. If this fluctuation has instantaneously raised the smoothing filter output level, less time will be required to drive that level up to the recognition threshold as the recognition signal arrives. If the fluctuation has instantaneously lowered the smoothing filter output level, more time will be required to drive that level up to the recognition threshold as the recognition signal arrives. The random error or uncertainty thus introduced into range calculations by noise is termed recognition time uncertainty or recognition jitter.

Since recognition jitter in a prior art ranging system using a CFAR receiver is primarily a function of the random noise variations occurring during the smoothing time interval just prior to the time a recognition signal is first sensed, it is substantially independent of signal-to-noise ratio. It is primarily a function of the noise alone. The error or uncertainty introduced into range calculations by recognition jitter does not decrease significantly as the signal-to-noise ratio increases beyond the minimum value required to raise the smoothing filter output above its noise-only level by a factor approximately equal to the bandwidth ratio of the receiver. This is a disadvantage of the prior art system. It is generally regarded as advantageous to design transmitter-receiver systems so that uncertainties due to noise decrease without limit as the signal-to-noise ratio increases and thereby improves.

Recognition jitter in a two-way link tends to be greater than in a one-way link. That is because of the uncertainty or error introduced into each of the two one-way links which are included in a two-way link. The recognition jitter for a two-way link is equal to the square root of the sum of the squares of the recognition jitter for the two included one-way links.

In currently used acoustic ranging systems, typical values for the carrier-wave frequency are in the range of from about seven kilohertz (7 KHz) to about sixteen kilohertz (16 KHz). Typical pulse durations for the recognition signal tone-bursts in these systems are in the range from about four milliseconds (4 ms) to about ten milliseconds (10 ms). For two-way links in such systems, the three-standard-deviation recognition jitter is typically about ±0.5 milliseconds.

Some prior art acoustic ranging systems have been designed in which the recognition jitter is reduced below that obtainable in the prior art systems using CFAR receivers discussed above. These improved systems employ digital-code correlation techniques. In these systems, a transmitter initiates transmission of a coded serial bit-stream, typically about thirty bits long, at a carrier frequency of about ten kilohertz. A receiver incorporates means for correlating a received bit-stream with a stored digital word having the intended predetermined thirty-bit code. If the correct code is received, the correlation function has a sharp peak which rises above the recognition threshold. The three-standard-deviation recognition jitter in such systems is typically about plus or minus one bit or about ±100 microseconds. This is an improvement of about five-to-one over the prior art ranging systems using CFAR receivers discussed above.

The relatively lower recognition jitter and accompanying higher accuracy range determination obtained in acoustic ranging systems using digital code correlation techniques requires a significant increase in equipment complexity and cost over that of acoustic ranging systems using CFAR receivers. In addition, the power required to be expanded is significantly increased in certain digital-code correlation technique embodiments. While increased power consumption may not be a serious deterrent to use of a given technique in a ship set, or a system having a short useful life as in the case of some torpedoes, increased power consumption is a strong negative factor in situations requiring a transponder placed on the ocean floor for long term use. Increased power consumption can be accommodated in such a transponder only by accepting a shorter life for the transponder's self-contained power supply, or by increasing the capacity of the power supply. It is desirable to avoid both of these alternatives.

Thus, there has long been a need for a reduced recognition jitter system that minimizes complexity and system power drain during its operational life.

SUMMARY OF THE INVENTION

It is an object of the present invention to reduce recognition jitter in a ranging system employing a limiting CFAR receiver. This is accomplished by providing a conditioning signal to the receiver to suppress noise therein prior to and up to the time of arrival at the receiver input of a pulsed recognition signal for range determination.

A related object of the present invention is to make possible an improved ranging system employing a CFAR receiver in which noise is suppressed in the CFAR receiver. In the present invention, this is accomplished by providing a conditioning signal to the receiver where the conditioning signal has a carrier-wave frequency displaced from the center of the passband of a selected narrow-band bandpass filter in the CFAR receiver. The conditioning signal is provided prior to the time of arrival at the receiver input of a pulsed recognition signal, or tone-burst, for range determination.

A further object of the present invention is to provide means and a method for reducing recognition jitter in a ranging system employing a CFAR receiver, wherein the reduction of recognition jitter may be accomplished without modification to the CFAR receiver itself. This is accomplished in the present invention inasmuch as the source for conditioning signals may be external to the CFAR receivers of the ranging system.

Still another object of the present invention is to provide means and a method for making a reduction in recognition jitter in a ranging system employing a CFAR receiver wherein the reduction in recognition jitter increases without limit in proportion to increases in the signal-to-noise ratio at the CFAR receiver input. This is accomplished in the present invention by providing a conditioning signal to the receiver which suppresses the noise level at the input to the receiver's threshold-responsive pulse-generating circuits prior to and at the instant recognition of a recognition signal is initiated.

These and other features of the invention are provided by the ranging system disclosed herein. In a ranging system according to the invention, a conditioning signal is provided to a constant false alarm rate receiver prior to the time at which a recognition signal arrives at, and is sensed by, the receiver. The conditioning signal alone is provided to the receiver for at least as long a time as is required to suppress noise in the receiver at the output of the smoothing filter, or, correspondingly, at the input to the threshold-responsive recognition circuit. The conditioning signal is preferably maintained on for at least as long as is required to keep the noise suppressed at the input to the threshold-responsive recognition means up to the instant in time at which the recognition signal is available to control noise suppression in the receiver. In a preferred embodiment of this invention, the conditioning signal is synchronized to the recognition signal in that the conditioning signal is turned off at the instant the recognition signal is turned on.

The conditioning signal is given a frequency distribution of power lying substantially within the passband of the broad bandwidth bandpass filter. In addition, the conditioning signal preferably has a frequency distribution of power so displaced from the center of the passband of the one or more narrow bandwidth bandpass filters in the receiver that the preselected recognition threshold level at the inputs to the one or more threshold-responsive recognition circuits is not likely to be reached in response to the conditioning signal. Any tendency of the conditioning signal to drive the input signal level at the threshold-responsive recognition means in the receiver above the preselected recognition threshold level is thereby inhibited.

As in the prior art, the frequency distribution of power for a recognition signal lies substantially within the passbands of both the broad bandwidth bandpass input filter and a selected narrow bandwidth bandpass filter of the receiver.

Inasmuch as noise is suppressed in the receiver by the conditioning signal, the recognition signal is sensed and then recognized in the receiver with reduced recognition jitter. This reduction in recognition jitter is proportional, without upper limit, to the signal-to-noise ratio prevailing during the interval in which the conditioning signal has control of the limiter in the receiver. This reduction of recognition jitter may be accomplished without modification to the CFAR receiver hardware.

The conditioning signal may be provided by the same transmitter which provides the recognition signal or by a conditioning signal source external to that transmitter.

As has been mentioned, the conditioning signal is preferably made available up to the time the recognition signal is available to assume control of the limiter and control noise suppression in the receiver. In a preferred embodiment, where the availability of the conditioning signal is terminated at the instant the recognition signal is made available, the two signals are said to be synchronized to each other.

Where the conditioning signal and the recognition signal are synchronized to each other, the amplitude, or strength, of the conditioning signal may be as large as, and even larger than, the amplitude of the recognition signal. This is so because, in this case, the two signals will not be present in the receiver at the same time and therefore will not be required to compete with each other for control of the limiter. However, if the conditioning signal is to be provided during times when a recognition signal may be sensed by a receiver, the amplitude of the conditioning signal must be kept small enough to permit control of the limiter to be assumed by an incoming recognition signal. In the embodiments using a conditioning signal having a lower amplitude than the recognition signal, power consumption in the conditioning signal source may be less, but recognition jitter is not reduced as much in the CFAR receiver as is possible.

BRIEF DESCRIPTION OF THE DRAWING

The preferred and other embodiments of the present invention are illustrated in the accompanying drawing, wherein similar reference characters refer to similar elements throughout and in which:

FIG. 1 shows a schematic diagram of an acoustic ranging system having a two-way link.

FIG. 2 is a graphic illustration of a two-part tone-burst and of the effect of the two-part tone-burst in a CFAR receiver.

FIG. 3 is a block diagram of the transmitter of FIG. 1.

FIG. 4 is a block diagram of another embodiment of applicant's invention.

DESCRIPTION OF THE PREFERRED EMBODIMENTS

Referring now to the drawing, there is shown in FIG. 1 an embodiment of the present invention. The acoustic ranging system of FIG. 1 includes a ship set 10, which may be on a ship (not shown) for navigation purposes, and an underwater transponder 12 at a fixed known position on the ocean floor. The ship set 10 includes a transmitter 14 and a CFAR receiver 16. The ship set transmitter 14 initiates propagation of a two-part pulsed interrogation signal along a path indicated by dashed line 22 to a CFAR transponder receiver 20 of the underwater transponder 12. The two-part pulsed interrogation signal includes a conditioning signal portion and a recognition signal portion.

Transponder receiver 20 senses the interrogation signal and eventually responds to, or recognizes, the recognition signal portion of the two-part interrogation signal. At recognition, the transponder receiver 20 energizes a transponder transmitter 18 of the underwater transponder 12, as indicated by the arrow 24. The transponder transmitter 18 initiates propagation of a two-part pulsed reply signal along a path indicated by dashed line 26 to the ship set receiver 16. The two-part pulsed reply signal includes a conditioning signal portion and a recognition signal portion.

Ship set receiver 16 senses the reply signal and eventually recognizes the recognition signal portion of the two-part reply signal. The total elapsed time from initiation of the recognition signal portion of the interrogation signal to recognition of the recognition portion of the reply signal is a measure of the range from the ship having ship set 10 to the transponder 12. The ranging system of FIG. 1 uses a combination of two one-way links to form a two-way link.

At the upper portion of FIG. 2, there is shown a representation of the envelope of a two-part signal 28 for ranging in accordance with the invention. In FIG. 2, time increases from left to right. The two-part signal 28 is initiated at time T0. During the time interval from T0 to T1, the two-part signal 28 is a conditioning signal portion 30. During the time interval from T1 to T2, the two-part signal 28 is a recognition signal portion 32.

The two-part signal 28 of FIG. 2 may be either a pulsed interrogation signal as initiated by the ship set transmitter 14 of FIG. 1 as shown by path 22 or a pulsed reply signal as initiated by the transponder transmitter 18 of FIG. 1 as shown by path 26. Where the two-part signal 28 is taken to be an interrogation signal, the recognition signal portion 32 thereof is a monochromatic tone-burst having a frequency distribution of power lying substantially within the passband of a selected narrow bandwidth bandpass filter in the transponder CFAR receiver 20 of FIG. 1. In this case, the conditioning signal portion 30 of the two-part signal 28 is a monochromatic tone-burst having a frequency distribution of power so displaced from the center of the passband of the selected narrow bandwidth bandpass filter and from the centers of the passbands of any other narrow bandwidth bandpass filters which may be in the transducer receiver 20 of FIG. 1 that false alarms due to the presence of this conditioning signal 30 and suppressed noise in the transponder receiver 20 are inhibited and preferably no more likely to occur than when no signal is present.

Where the two-part signal 28 is taken to be a reply signal, the recognition signal portion 32 thereof is a monochromatic tone-burst having a frequency distribution of power lying substantially within the passband of a selected narrow bandwidth bandpass filter in the ship set CFAR receiver 16 of FIG. 1. In this case, the conditioning signal portion 30 of the two-part signal 28 is a monochromatic tone-burst having a frequency distribution of power so displaced from the center of the passband of the selected narrow bandwidth bandpass filter and from the centers of the passbands of any other narrow bandwidth bandpass filters which may be in the receiver 16 of FIG. 1 that false alarms due to the presence of this conditioning signal 30 and suppressed noise in the ship set receiver 16 are inhibited and are preferably no more likely to occur than when no signal is present.

As indicated by the uniform envelope in FIG. 2 of the two-part signal 28, the amplitudes of the conditioning signal portion 30 and the recognition signal portion 32 are preferably about equal. A greater amplitude for the conditioning signal portion 30, relative to the recognition signal portion 32, will produce greater noise suppression, but will also require more power. If the amplitude of the conditioning signal portion 30 is made less than that of the recognition signal portion 32, energy can be conserved at the transmitter, but, without more, noise suppression will be less and recognition jitter will be correspondingly greater.

For optimal jitter reduction, the conditioning signal portion 30 of the two-part signal 28 is preferably synchronized to the recognition signal portion 32 at the transmitter. That is to say, transmission of the conditioning signal 30 is terminated at the instant transmission of the recognition signal 32 is begun. An interval between the transmission of the two signals will permit noise build-up in the receiver during such interval. If the two signals overlap in time, capture of the limiter by the recognition signal portion may be delayed, thus introducing a new source of error.

In addition, the conditioning signal portion 30 of the two-part signal 28 is preferably made coherent with the recognition signal portion 32 at the transmitter. That is to say, the transmission of the conditioning signal portion 30 is preferably always terminated at the same phase angle of its sinusoidal waveform and the transmission of the recognition signal portion 32 is always begun at the same phase angle of its sinuosidal waveform. Both the conditioning signal termination and the recognition signal beginning may be at, for example, positive-going axis crossings. This coherence of the signal portions obtained by precise switching from one signal to the other is important where an attempt is being made to reduce the recognition jitter to times which are on the order of a cycle period or less of the carrier-wave frequencies of the signals. In these cases, it is desirable to prevent uncertainties which may arise by reason of the difference in transients which may occur due to uncontrolled phase variations at the ending of the conditioning signal 30 and the beginning of the recognition signal 32. Coherence of the two signals may not be as important in cases where the frequency of the signals is high and the corresponding cycle period is significantly less than the minimum achievable recognition jitter.

Techniques, well known to those skilled in the art, are available for coding a transmitter to produce a two-part signal 28 having monochromatic tone-bursts at different carrier-wave frequencies therein, such as the conditioning signal portion 30 and the recognition signal portion 32, where the tone-bursts are synchronized to each other and made coherent with each other as these terms are defined hereinabove.

The duration or pulse width of the recognition signal portion 32 of the two-part signal 28 is selected based on considerations well known to those skilled in the art. A typical recognition signal pulse width is about ten milliseconds. The duration or pulse width of the conditioning signal portion 30 of the two-part signal 28 is selected to be long enough to permit transients to die out at the smoothing filter output. Unduly long durations for the conditioning signal 30 would waste energy. In the preferred embodiment, the conditioning signal portion 30 has a pulse width about twenty percent of the pulse width of the recognition signal portion 32. For the typical case where the recognition signal portion 32 pulse width is ten milliseconds, the preferred conditioning signal portion 30 pulse width is, therefore, about two milliseconds. Of course, longer pulse widths for the conditioning signal 30 may be used where the energy penalty sustained is not a consideration. Shorter pulse widths, on the other hand, will tend to allow an increase in recognition jitter.

The lower part of FIG. 2 is a curve 34, representing the dynamic behavior of a CFAR receiver at the time a two-part interrogation or reply signal 28 is received. More particularly, the curve 34 represents the output of a smoothing filter or, correspondingly, the input to a threshold-responsive pulse-generating circuit. The curve 34 has been adjusted to ignore the effects of time delays in the receiver so that the events on the curve 34 are shown occurring simultaneously with the corresponding events occurring at times T0, T1 and T2 in the two-part signal 28.

In FIG. 2, dashed horizontal line 36 represents the average noise power level at the input to a threshold-responsive pulse-generating circuit at a time earlier than T0, when no signal is present. Dashed horizontal lines 38 and 40, above and below the average noise power level line 36, represent, for example, a three-standard-deviation variation about the average noise power level in the absence of signal. The instantaneous level of the input to the pulse generating circuit fluctuates in the region between lines 38 and 40 most of the time.

At time T0, the conditioning signal portion 30 of the two-part signal 28 is sensed by the CFAR receiver. The input to the pulse-generating circuit, curve 34, changes to the level indicated by dashed horizontal line 42. The frequency distribution of power of the conditioning signal portion 30 is sufficiently displaced from the center frequency of the associated narrow-bandwidth bandpass filter that the pulse-generating circuit input of curve 34 does not reach the recognition threshold as represented by dashed horizontal line 44. Any tendency of the conditioning signal to trigger a false alarm is thereby inhibited. As shown in FIG. 2, the curve 34 rises closer to the recognition threshold 44 in response to the conditioning signal portion 30. This closer approach to the recognition threshold 44 can be accommodated without increasing the probability of false alarms inasmuch as the presence of the conditioning signal portion 30 suppresses noise in the receiver. The variations about the mean of the curve 34 due to noise after conditioning signal portion 30 reception are not represented in FIG. 2. The suppression of these variations is proportional to the signal-to-noise ratio at the input to the CFAR receiver limiter.

For a conditioning signal portion 30 having the same amplitude as its associated recognition signal portion 32, the carrier-wave frequency should be selected to fall at about at least six decibels of attenuation on the narrow-bandwidth passband filter frequency characteristic to avoid increasing the false alarm rate by inhibiting the conditioning signal from driving the input signal level at the threshold-responsive recognition means in the receiver above the preselected recognition threshold level. An attenuation of about ten decibels is preferred.

It is not necessary that the pulse-generating circuit input level 34 rise closer to the recognition threshold 44 when the conditioning signal portion 30 is sensed. If the carrier-wave frequency of the conditioning signal portion 30 is displaced further toward a skirt of the frequency characteristic of the associated narrow-bandwidth passband filter, the input level 34 may be the same as, or even less than, the pre-existing average noise input level as represented by line 36. Regardless of the absolute level taken by the input level 34 to the pulse-generating circuit, the noise suppression will be the same for the same signal-to-noise ratio at the limiter.

At time T1, the recognition signal portion 32 of the two-part signal 28 arrives at the CFAR receiver. Since the carrier-wave frequency, or frequency distribution of power, of the recognition signal portion 32 falls at about the center of the passband of a selected narrow-bandwidth bandpass filter, it is passed with minimum attenuation and the input level 34 of the associated threshold-responsive pulse-generating circuit is driven above the recognition threshold 44 at time T2. Since noise suppression at time T1 is in effect due to the presence of the conditioning signal portion 30 at that instant and earlier, random variations of the length of the recognition interval from time T1 to T2 are reduced in proportion to the conditioning signal portion 30 signal-to-noise ratio at the input to the limiter. This is the desired effect.

Laboratory tests have been performed to demonstrate the effectiveness of the invention. The carrier-wave frequencies were 7.0 KHz for the recognition signal portion 32 and 7.2 KHz for the conditioning signal portion 30. Switching from the carrier-wave frequency of the conditioning signal portion 30 to the carrier-wave frequency of the recognition signal portion 32 in the two-part signal 28 was both synchronous and coherent. The signal-to-noise ratio was relatively high. The recognition signal portion 32 pulse width was fixed at ten milliseconds, while the conditioning signal portion 30 pulse width was varied.

Table I shows the reduction obtained in the three-standard-deviation recognition jitter for the test system as the pulse width of the conditioning signal portion 30 was increased. These results remained valid for the input amplitude levels which varied over a range of 100 db. The minimum signal-to-noise ratio was in the range of from about 20 to about 40 db.

TABLE I

| Conditioning Signal Pulse Width (milliseconds) | Three-Standard-Deviation Recognition Jitter (milliseconds) |
|---|---|
| 0 | ±0.50 |
| 0.5 | ±0.35 |
| 1.0 | ±0.25 |
| 1.5 | ±0.20 |
| 2.0 | ±0.15 |
| 2.5 | ±0.10 |
| 3.0 | ±0.10 |

FIG. 3 is a schematic diagram, showing the transmitter 14 of FIG. 1, which includes, as a portion thereof, means for providing the above described conditioning signal, so that the transmitter 14 transmits to the transponder receiver 20 the conditioning signal and recognition signal. In other embodiments, as noted above, the conditioning signal may be provided by means external to the transmitter 14. As shown in FIG. 4, which is a schematic diagram of another embodiment of applicant's invention, there is provided the transmitter 14', which may be generally similar to the transmitter 14 above, except that it is adapted to transmit only the recognition signal to the transponder 20. A separate means for providing the conditioning signal 14a' is provided to transmit the conditioning signal to the transponder 20. The relative locations of the transmitter 14' for transmitting the recognition signal and the means for providing the conditioning signal 14a' may be as selected by those skilled in the art. For example, as noted below, the means for providing the conditioning signal 14a' may, if desired, be positioned close to the transponder 20. Alternatively, any other separation from the transmitter 14' may be utilized as desired.

While the invention has been described with respect to the preferred embodiment thereof, it will be understood by those skilled in the art that various changes in form and details may be made therein without departing from the spirit and scope of the invention.

For example, although the invention has been described primarily in terms of one-way and two-way links in an acoustic ranging system, it will be apparent that the invention is also applicable to echo ranging systems in which the only receiver is in the vicinity of the transmitter. The invention is also applicable to radio ranging systems (radars) using CFAR receivers. An another example, the conditioning signal can be a continuous signal, rather than a pulsed one, which is generated in a source close to the receiver of interest rather than in a remote transmitter. The strength of this continuous conditioning signal at the CFAR receiver input must be significantly less than that of the pulsed recognition signals that are desired to be recognized. This is in order that the desired recognition signals can capture control of the limiter in the presence of the conditioning signal. As still another example, a synchronized and coherent pulsed conditioning signal can be transmitted as part of a two-part signal, as in the preferred embodiment, but at a lower amplitude in order to conserve energy in, for example, an underwater transponder. Passing this reduced-amplitude conditioning signal through a narrow-bandwidth bandpass filter having its frequency characteristic centered on the carrier-wave frequency of the conditioning signal and through an amplifier will provide an enhanced signal-to-noise ratio for the conditioning signal in the receiver. As a further example of a modification, a suitable variation in the frequency distribution of power in a two-part signal may be accomplished using amplitude modulation or frequency modulation techniques rather than simple switching techniques.

Further, in some applications it may be desirable to select the conditioning signal pulse width to fill the entire interval between recognition signal pulses. This is done to suppress the reception of weaker multi-path reflections of the recognition signal. This is particularly appropriate in applications where there is information content coded in the pulse width or pulse repetition rate of the recognition signal. In the absence of such a conditioning signal, in these applications, the multi-path fill-in tends to extend the apparent recognition signal pulse width to the point that it may appear to the receiver to be essentially continuous wave and the coded information is lost.

What is claimed is:

1. A method of reducing recognition jitter in a ranging system, comprising the steps of:
   providing a limiting constant false alarm rate receiver of the type having a broad bandwidth bandpass filtering means, a narrow bandwidth bandpass filtering means and threshold-responsive recognition means;
   providing a pulsed recognition signal to said receiver; and
   providing a conditioning signal to said receiver prior to a time of providing said pulsed recognition signal to said receiver, wherein said conditioning signal has a frequency distribution of power lying substantially within the passband of said broad bandwidth bandpass filtering means in said receiver and wherein said conditioning signal frequency distribution of power is displaced from the center of the passband of said narrow-bandwidth bandpass filtering means in said receiver to inhibit said conditioning signal driving the input signal level at said threshold-responsive recognition means in said receiver above a preselected recognition threshold level.

2. The method defined in claim 1 and further comprising the step of pulsing said conditioning signal.

3. The method defined in claim 2 and further comprising the step of synchronizing said pulsed conditioning signal to said pulsed recognition signal.

4. The method defined in claim 3 and further comprising the step of providing said pulsed conditioning signal coherent with said pulsed recognition signal.

5. The method defined in claim 2 and further comprising the step of providing said pulsed conditioning signal for a time duration approximately 20% of the time duration of said pulsed recognition signal.

6. The method defined in claim 2 and further comprising the step of providing said pulsed conditioning signal for a time duration sufficient to fill the entire interval between pulsed recognition signals.

7. The method defined in claim 1 and further comprising the step of providing said conditioning signal and said recognition signal at substantially the same amplitude.

8. The method defined in claim 7 and further comprising the step of attenuating said conditioning signal by at least about six decibels relative to said recognition signal by said narrow bandwidth bandpass filtering means.

9. The method defined in claim 8 and further comprising the step of attenuating said conditioning signal by about ten decibels relative to said recognition signal by said narrow bandwidth bandpass filtering means.

10. The method defined in claim 1 and further comprising the step of providing a continuous conditioning signal.

11. The method defined in claim 10 and further comprising the step of providing the amplitude of said conditioning signal less than the amplitude of said recognition signal.

12. A method of reducing recognition jitter in a ranging system, comprising the steps of:
providing a limiting constant false alarm rate receiver of the type having a broad bandwidth bandpass filtering means, a narrow bandwidth bandpass filtering means and threshold-responsive recognition means;
providing a pulsed recognition signal to said receiver, wherein said pulsed recognition signal has sufficient strength and frequency distribution of power to cause said threshold-responsive recognition means in said receiver to respond to the reception of said pulsed recognition signal; and
providing a conditioning signal to said receiver at a time prior to said step of providing said pulsed recognition signal wherein said conditioning signal suppresses noise in said receiver at the input of said threshold-responsive recognition means at the instant in time when said threshold-responsive recognition means begins responding to said pulsed recognition signal and wherein the combination of strength and frequency distribution of power of said conditioning signal is selected to inhibit response of said threshold-responsive recognition means to said conditioning signal.

13. The method defined in claim 12 and further comprising the step of pulsing said conditioning signal.

14. The method defined in claim 13 and further comprising the step of synchronizing said pulsed conditioning signal to said pulsed recognition signal.

15. The method defined in claim 14 and further comprising the step of providing said pulsed conditioning signal coherent with said pulsed recognition signal.

16. The method defined in claim 13 and further comprising the step of providing said pulsed conditioning signal for a time duration approximately 20% of the time duration of said pulsed recognition signal.

17. The method defined in claim 13, and further comprising the step of providing said pulsed conditioning signal for a time duration sufficient to fill the entire interval between pulsed recognition signals.

18. The method defined in claim 12 and further comprising the step of providing said conditioning signal and said recognition signal at substantially the same amplitude.

19. The method defined in claim 18 and further comprising the step of attenuating said conditioning signal by at least about six decibels relative to said recognition signal by said narrow bandwidth bandpass filtering means.

20. The method defined in claim 19 and further comprising the step of attenuating said conditioning signal by about ten decibels relative to said recognition signal by said narrow bandwidth bandpass filtering means.

21. The method defined in claim 12 and further comprising the steps of providing a continuous conditioning signal.

22. The method defined in claim 21 and further comprising the step of providing the amplitude of said conditioning signal less than the amplitude of said recognition signal.

23. An arrangement for reducing recognition jitter in a ranging system comprising, in combination:
a limiting constant false alarm rate receiver having broad-bandwidth bandpass filtering means, limiter means, narrow-bandwidth bandpass filtering means, limiter means, narrow-bandwidth bandpass filtering means, detector means, smoothing filter means and threshold-responsive recognition means, connected in cascade;
means for providing a conditioning signal to said receiver, wherein said conditioning signal has a frequency distribution of power lying substantially within the passband of said broad-bandwidth bandpass filtering means and wherein said conditioning signal frequency distribution of power is displaced from the center of the passband of said narrow-bandwidth bandpass filtering means to inhibit said conditioning signal driving the input level at said threshold-responsive recognition means above a preselected recognition threshold level; and
transmitter means for initiating propagation of a pulsed recognition signal from said transmitter means to said receiver, wherein said pulsed recognition signal has a frequency distribution of power lying substantially within the passbands of said broad-bandwidth bandpass filtering means and said narrow-bandwidth bandpass filtering means.

24. The arrangement recited in claim 23, wherein said means for providing a conditioning signal comprises means for providing a pulsed conditioning signal.

25. The arrangement recited in claim 23, wherein said means for providing a conditioning signal comprises means for providing a pulsed conditioning signal which is synchronized to said pulsed recognition signal.

26. The arrangement recited in claim 23, wherein said means for providing a conditioning signal comprises means for providing a pulsed conditioning signal which is coherent with said pulsed recognition signal.

27. The arrangement recited in claim 23, wherein said means for providing a conditioning signal comprises means for providing a pulsed conditioning signal for a duration of approximately twenty percent of the duration of said pulsed recognition signal.

28. The arrangement recited in claim 23, wherein said means for providing a conditioning signal comprises means for providing a pulsed conditioning signal for a duration substantially equal to the time interval between successive pulsed recognition signals.

29. The arrangement recited in claim 23, wherein said means for providing the conditioning signal comprises means for providing said conditioning signal having an amplitude substantially equal to the amplitude of said pulsed recognition signal.

30. The arrangement recited in claim 29, wherein said narrow-bandwidth bandpass filter of said receiver comprises means for attenuating said conditioning signal in an amount substantially equal to six decibels relative to said recognition signal.

31. The arrangement recited in claim 29, wherein said narrow-bandwidth bandpass filter of said receiver means comprises means for attenuating said conditioning signal in amounts substantially equal to ten decibels relative to said recognition signal.

32. The arrangement recited in claim 23, wherein said means for providing a conditioning signal comprises means for providing a continuous conditioning signal.

33. The arrangement recited in claim 23, wherein said means for providing a conditioning signal comprises means for providing a continuous signal having an amplitude at a value less than the amplitude of said recognition signal.

34. An arrangement for reducing recognition jitter in a ranging system comprising, in combination:

first limiting constant false alarm rate receiver means having first broad-bandwidth bandpass filtering means, first limiter means, first narrow-bandwidth bandpass filtering means, first detector means, first smoothing filter means, and first threshold-responsive recognition means, connected in cascade;

first transmitter means for initiating propagation of a first pulsed signal from said first transmitter means to said first receiver means, wherein said first pulsed signal includes a first conditioning signal portion having a frequency distribution of power sufficiently displaced from the center of the passband of said first narrow-bandwidth bandpass filtering means to inhibit said first conditioning signal driving the input level at said first threshold-responsive recognition means above a first preselected recognition threshold level, and wherein said first pulsed signal further includes a first recognition signal portion having a frequency distribution of power lying substantially within the passband of said first broad-bandwidth bandpass filtering means and said first narrow-bandwidth bandpass filtering means, and wherein the transmission of said first conditioning signal portion precedes in time the transmission of said first recognition signal portion of said first pulsed signal;

second constanty false alarm rate receiver means having second broad-bandwidth bandpass filtering means second limiter means, second narrow-bandwidth bandpass filtering means, second detector means, second smoothing filter means and second threshold-responsive recognition means, connected in cascade; and second transmitter means operatively coupled to said first constant false alarm rate receiver to respond to said first receiver means for the condition of said input level at said first threshold-responsive recognition means rising above said first preselected recognition threshold level to thereby initiate propagation of a second pulsed signal from said second transmitter means to said second receiver means, wherein said second pulsed signal includes a second conditioning signal portion having a frequency distribution of power sufficiently displaced from the center of the passband of said second narrow-bandwidth bandpass filtering means to inhibit said second conditioning signal driving the input level of said second threshold-responsive recognition means above a second preselected recognition threshold level, and wherein said second pulsed signal further includes a second recognition signal portion having a frequency distribution of power lying substantially within the passband of said second broad bandwidth bandpass filtering means and said second narrow bandwidth bandpass filtering means, and wherein the transmission of said second conditioning signal portion precedes in time the transmission of said second recognition signal portion of said second pulsed signal.

* * * * *